March 2, 1937.    W. H. MAY    2,072,564
HOT WATER BOTTLE COVER
Filed Oct. 24, 1934
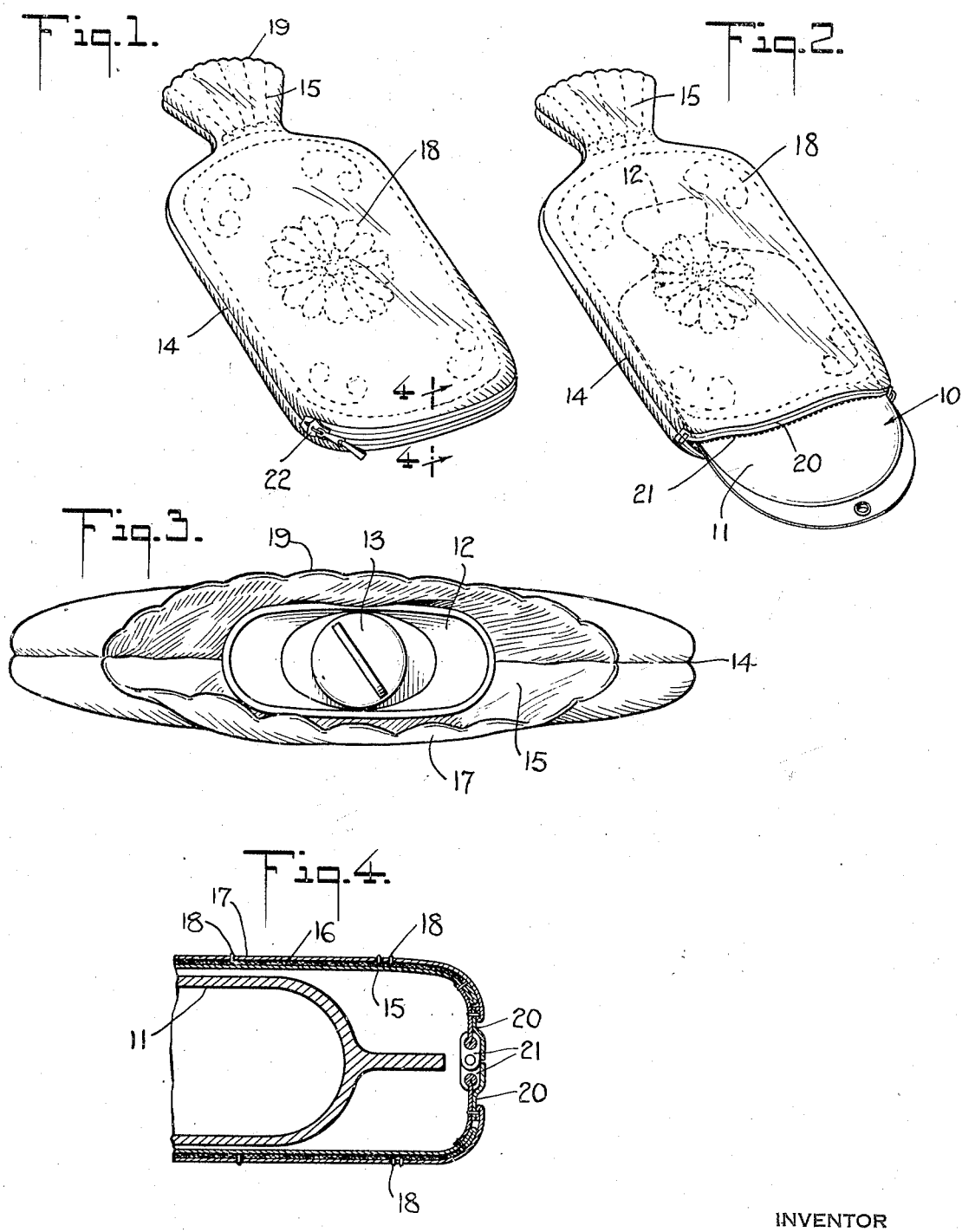
INVENTOR
Walter H. May
BY
HIS ATTORNEY Patented Mar. 2, 1937

2,072,564

UNITED STATES PATENT OFFICE 2,072,564

HOT WATER BOTTLE COVER

Walter H. May, Pelham Manor, N. Y.

Application October 24, 1934, Serial No. 749,725

1 Claim. (Cl. 128—258)

My present invention relates to hot water bottles and more particularly to an improved removable cover for the same.

My invention is designed not only as a protective covering for a hot water bottle, which hot water bottle is ordinarily made of flexible rubber, but also as a means for conserving the heat when the hot water bottle is filled with hot water. Also, the cover is removable in order that the water bottle may be filled or emptied without injury to the cover and for the purpose of permitting the cover to be washed or cleansed at any time desired.

The object of my invention is a relatively light, quickly removable and heat conserving covering for hot water bottles.

In the accompanying drawing,

Fig. 1 is a perspective view of a hot water bottle cover made according to my present invention;

Fig. 2 is a perspective view of my improved cover for hot water bottles showing the lower end thereof opened and a hot water bottle partially inserted within the cover;

Fig. 3 is a top plan view of my improved hot water bottle cover showing the neck thereof and with a hot water bottle in position therein, on an enlarged scale, and Fig. 4 is a sectional view on the line 4—4 of Fig. 1, on an enlarged scale.

Referring to the drawing, 10 designates the usual hot water bottle of rubber, or other like flexible elastic material having an ordinary oval shaped body 11, on which is integrally formed an open ended outwardly flaring neck portion 12. The junction between the neck 12 and body 11 is provided with the usual internally screw threaded opening (not shown) closed by a removable screw-threaded plug 13, such plug 13 when in position being below the upper open end of the neck 12.

The cover forming the subject matter of my present invention and enclosing the water bottle above described, is made in two parts or sides sewn together along their meeting edges 14, and each of the edges has the same general contour as the hot water bottle 10. The sides of the cover are each preferably composed of an inner lining 15, of any suitable material such as fabric, on the outside of which is placed an enclosing envelope composed of a layer of cellular fabric material, such as batting 16, and which layer is faced on its outside surface with an outer covering of fabric 17, such fabric 17 for purposes of utility and ornament being preferably formed of muslin, satin or the like. The members 16 and 17 are quilted together by the lines of stitching 18 which preferably form an ornamental design on the outer covering material 17. The inner cellular layer 16 as well as the inner lining 15 extends to the limit of the outer covering material 17, and all such layers of material having the same general outline as the hot water bottle 10. Also the design for the quilting extends not only on the main body portion of the outer material 17 but also on the neck portion, which is likewise at its open edge pinked or scalloped as indicated by the reference numeral 19.

As stated above, the cover elements are stitched together along the meeting edges as indicated by the reference numeral 14 in Fig. 3. It will be noted, however, that such stitching 14 does not extend along the lower edges of material 15, 16 and 17. To such lower edges however are attached the closing members 20 and 21, which have mounted thereon the well known commercial form of slide fastener 21 and which slide fastener elements are moved into and out of engagement with each other by the usual slider 22.

The material composing the members 15, 16 and 17, as stated above, is fabric and therefore slightly extensible. The cover members 15, 16 and 17 are extended upwardly from their body portion and shaped to provide a restricted neck portion and an upwardly flared open mouth portion 23. Thus, the neck portion of the cover approaches in diameter the neck portion of the hot water bottle 10, so that when the hot water bottle 10 is inserted within the cover above described, the open flaring neck 12 of the hot water bottle 10 will be substantially housed within the open flaring mouth and restricted neck portion of the cover. When the hot water bottle 10 is so positioned completely within the limits of the cover, the slider 22, upon being moved to the right from the position shown in Fig. 2 to the position shown in Fig. 1, will completely house and conceal the hot water bottle within the cover.

The quilting of the two outer layers of material 16, 17, and the attachment of the resultant composite layer to the inner layer 15 around the edges thereof only, will result in a cover which will be heat insulating, and therefore will result in conserving the heat of the material within the hot water bottle.

It will be observed that the formed neck portion of the cover attains flatwise, i. e., in continuous face to face engagement of cover material with the material of the container of the heating medium, thereby effecting uniformity of heat distribution about the neck portion as well as through the body of the cover, affording a smooth exterior surface of the cover with enhanced comfort when placed in contact with the person of the user, and imparting artistic appearance to the cover as a whole.

The cover may be readily removed from the hot water bottle 10 so that during the emptying or refilling of the hot water bottle there will be no danger of the cover becoming wet. Should it be desired to wash or cleanse the cover the same may be removed from the hot water bottle and washed in the usual manner.

The open mouth portion of the cover permits access to the closure plug of the hot water bottle while enclosed within the cover, to afford discharge of water or equivalent in whole or in part, and possibly for introducing water or equivalent heating medium, without removal of the bottle from the cover.

It is apparent that the opening at the bottom of the cover may be closed by closure means other than of the slide fastener type. The opening at the bottom of the cover is advantageous in the use of an electrically heated type of heating device, in that passage of the electrical cord or wiring is readily had through such opening notwithstanding closing of the slide fastener or equivalent closure means.

Having thus described my invention, what I claim as new is:

A cover forming a casing for a hot water bottle or equivalent comprising a body portion and extending therefrom a restricted neck portion, said restricted neck portion having a substantially smooth outer face, the said portions conforming generally to the contour of the body and neck portions of the hot water bottle, the neck portion of the casing having an outwardly flared open mouth providing access to the bottle neck and closure plug thereof for the purpose of adding to or releasing water from the bottle while the latter is maintained within the casing, and the body portion of the casing being provided with an opening at its bottom providing for the insertion and withdrawal of the hot water bottle, said neck and flared mouth portions of the casing being operative to position the bottle within the cover upon such insertion, and means for closing and opening the bottom opening.

WALTER H. MAY.